Oct. 15, 1929.  C. H. STERLING  1,731,830
OVERSPEED TRANSMISSION
Filed Nov. 5, 1926   3 Sheets-Sheet 2

Inventor
Claude H. Sterling
By Blackmore, Spencer & Fluke
Attorneys

Oct. 15, 1929.   C. H. STERLING   1,731,830
OVERSPEED TRANSMISSION
Filed Nov. 5, 1926   3 Sheets-Sheet 3

Inventor
Claude H. Sterling.
By Blackmore, Spencer & Hsu
Attorneys

Patented Oct. 15, 1929

1,731,830

UNITED STATES PATENT OFFICE

CLAUDE H. STERLING, OF DETROIT, MICHIGAN, ASSIGNOR TO GENERAL MOTORS RESEARCH CORPORATION, OF DETROIT, MICHIGAN, A CORPORATION OF DELAWARE

OVERSPEED TRANSMISSION

Application filed November 5, 1926. Serial No. 146,410.

This invention relates to power transmission. It is designed for use especially on motor vehicles to give several gear ratios between a driving and driven member.

In the ordinary motor vehicle transmission, it is customary to provide for the highest speed a direct drive between the driving shaft from the clutch and the driven shaft extending to the rear axle; lower speeds are secured by a drive through gearing, countershafts being employed for this purpose. The drive mechanism between this transmission unit and the rear axle includes a pinion and a ring gear having a reduction ratio.

The direct drive is ordinarily satisfactory for use on level roads and moderate grades. However, on long journeys on level roads the engine could function more effectively were the rear axle capable of being driven at a higher speed relative to the motor driving shaft than the usual ring gear and pinion set permits. The same difficulty exists in trucks for when driven without load they are often handicapped by too great a reduction at the ring gear for most efficient motor operation. This difficulty has been met in some instances by a double ring and pinion set giving two different ratios. The problem has also been attacked by modifying the transmission unit in which a step-up ratio is provided for, one in which the driven shaft rotates at a higher speed than the driving shaft. This invention is of the last named type.

An object of the invention is to provide the transmission housing with a step-up gearing connection whereby the propeller shaft is driven at a higher speed than the shaft from the motor. The invention also aims to accomplish this result by structure which shall be simple and compact.

Various forms may embody the inventive idea, two such forms being shown in the drawing.

Figure 1:
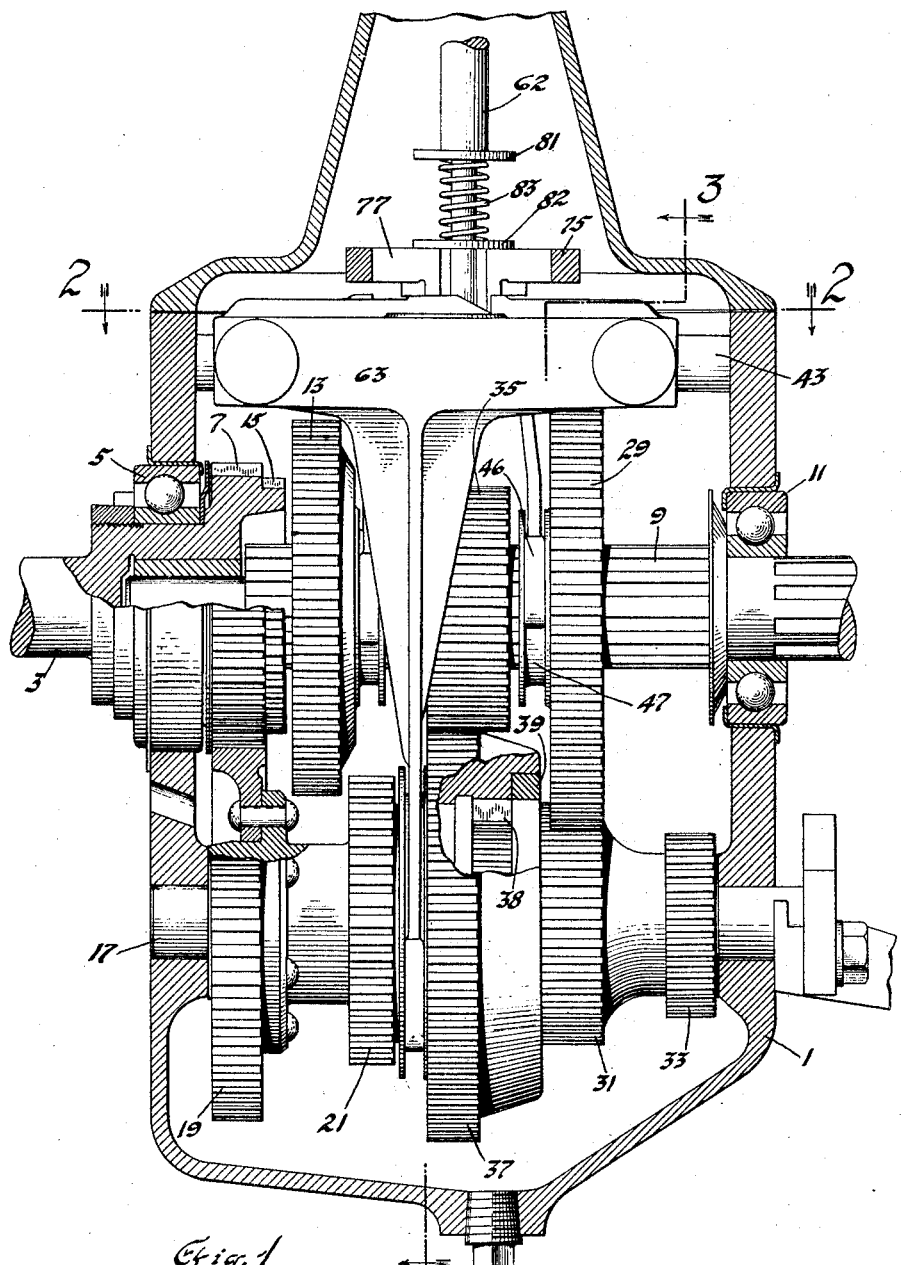
Figure 1 shows a longitudinal vertical section of the gearing of the transmission housing.
Figure 2:
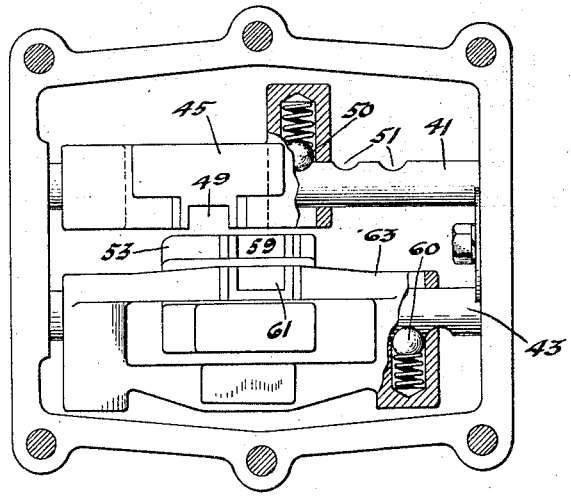
Figure 2 is a section on line 2—2 of Figure 1.
Figure 3:
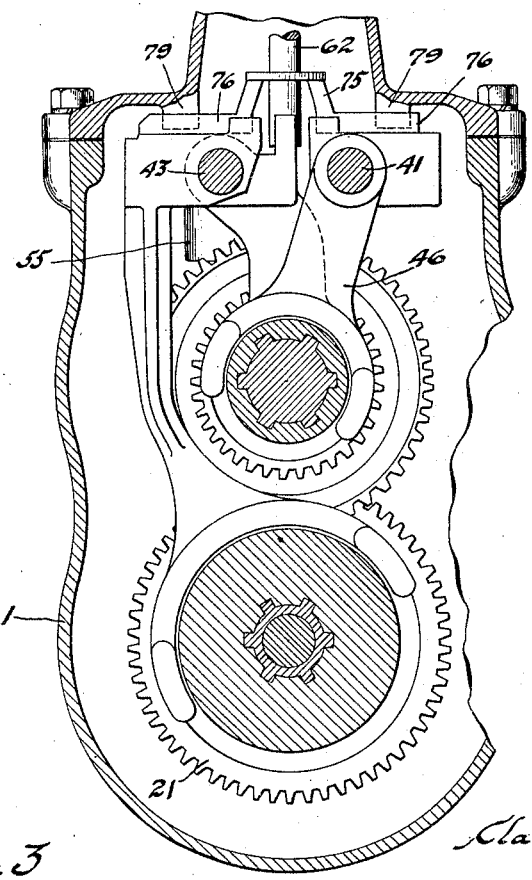
Figure 3 is a vertical section on line 3—3 of Figure 1.

Referring by reference characters to the drawing, and first to Figures 1 to 4, inclusive, numeral 1 represents the transmission housing. Entering the housing is a drive shaft 3 journalled in bearings 5 and having on its end within the housing a gear 7. Within the end of the shaft 3 is piloted the reduced end of a shaft 9 extending through the housing and having a bearing 11 within the wall of the same. Splined on shaft 9 is a gear 13 which may be moved on its shaft to engage clutch teeth 15 on gear 7. The cooperating clutch teeth on gear 13 being within the periphery of the gear and not shown. A counter-shaft 17 is journalled in the casing and carries a gear 19 in mesh with gear 7. The counter-shaft carries a gear 21 which may drive gear 13 when the latter is moved out of clutch engagement with gear 7 and into engagement with gear 21. Gear 29 on spline shaft 9 may be moved to the left (Figure 1) to engage a gear 31 on counter-shaft 17 to obtain a low-speed driving ratio. If gear 29 is moved to the right it engages an idler, not shown, which is itself in engagement with a reverse driving gear 33 on the counter-shaft 17.

The gearing thus far described provides for the usual direct drive, lower speed drives and a reverse drive. Gear 35 is an additional gear. It is fixed to the spline shaft 9. It is constantly in mesh with the gear 37 which is rotatably mounted on the hub of gear 21. The gear 37 is also slidable on this hub of gear 21 and when moved to the right, its teeth 38 may engage the external teeth of gear 31. Under these circumstances the gear 37 becomes a driving gear and drives the driven shaft through 35, it being observed that the gear 37 remains in mesh with 35 in both its positions, because of the greater length of teeth on gear 35. The gear ratio between 37 and 35 is such that the propeller shaft is speeded above the clutch shaft. Numeral 39 represents a hardened ring carried by gear 37 which ring engages and slides over the extremities of the teeth of gear 31 when gear 37 is being moved into clutched relation with gear 31.

The above gear movements are effected by the usual shifter forks operated by a single gear shift lever. Mounted longitudinally at the top of the housing are rods 41 and 43. On rod 41 is slidably mounted a shifter fork 45. It is downwardly extended to a yoke 46 engaging the collar 47 on gear 29. The shifter fork has a notch 49 engageable with the lower end of the lever whereby it may be moved in a longitudinal direction. Spring detent 50 on the shifter fork and notches 51 on the rod 41 assist in locating the operative positions of the shifter fork. The movements of this shifter fork to its extreme positions give the low and reverse drives, as explained above. A second shifter 53 is slidably mounted on rod 43. It also is provided with a housing 55 for a spring detent, not shown, engaging the under-side of rod 43. Its yoke engages a collar on gear 13. The extreme fore and aft positions of this sliding gear give the intermediate or second drive ratio and the direct drive, as explained above. In place of a notch for engagement with the operating lever, this second shifter has a slot 59 through which the lever may at times be moved for the purpose of actuating the over-speed drive. When so moved laterally through slot 59 the lever may enter a notch 61 on a third shifter fork 63. This third shifter has a double bearing on rod 43, as shown. This is a desirable construction in that its arm is relatively long and extends to a yoke operating in the collar of the counter-shaft gear 37. This shifter is shown as having a spring detent 60 to engage the rod 43.

Figure 4:
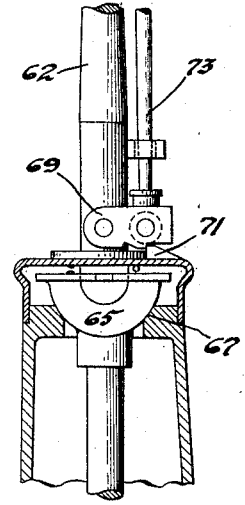
Figure 4 is a vertical sectional view of a detail.

As shown in Figure 4 the actuating lever 62 has a spherical surface 65 engaging a similar surface 67 formed to support the lever in the upper end of the housing cover. A pivoted latch 69 engages a projection 71 on the top of the casing cover so that the lever may not ordinarily be moved laterally for enough to cross the middle shifter and enter the notch 61 of the over-speed shifter fork. The latch is capable of being raised by hand operated rod 73 extended along the side of the lever, whereupon the lever may be moved to a lateral position which permits it to engage the notch 61 of the over-speed shifter. At 75 is shown a plate having a slot 77 through which the lever 62 may move in a longitudinal direction. The lever engages the walls of the slot laterally so that its transverse movements move the plate 75 laterally. The plate is provided with transverse extensions 76 which are guided by lugs 79 formed on the casing cover. The extensions are so shaped as to form an interlock with the slot and notches of the shifter forks in such a way that one fork at a time only can be actuated by the lever 62 in a manner well understood and clearly shown in Figure 3. For positioning the plate the operating lever 62 is reduced to form a shoulder for a disc 81. A second disc 82 on the lever engages the plate 75 over the slot and a coil spring 83 is placed between the discs. The discs and spring hold the plate 75 against the upper flat surfaces of the shifter forks.

Figure 5:
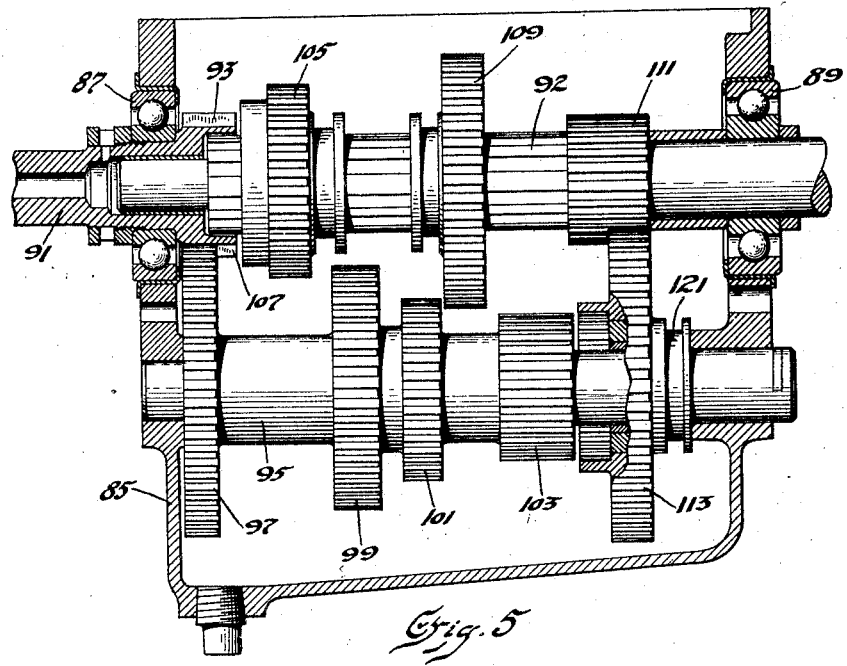
Figure 5 is a vertical section through a transmission housing showing a modified form of over-speed.
Figure 6:
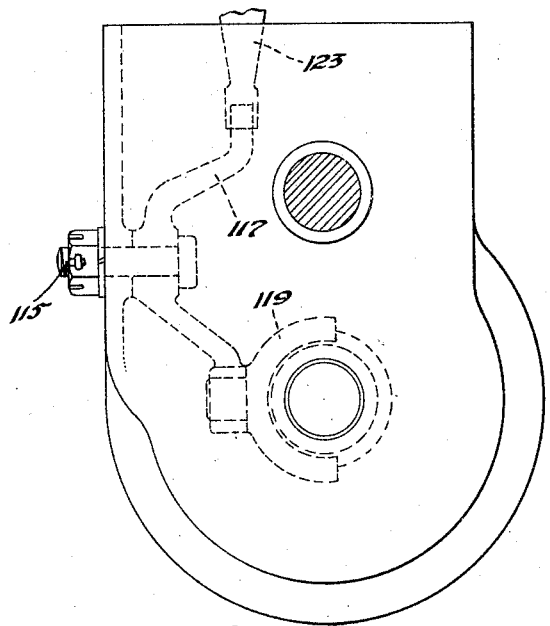
Figure 6 is an end view of the housing.
Figure 7:
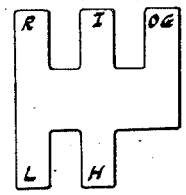
Figure 7 is a diagrammatical view of the slotted plate.

A second form of the invention is shown in Figures 5 and 6. In this form of the invention the casing 85 is provided with ball bearings 87 and 89 for the driving shaft 91 and spline shaft 92, respectively. Shaft 91 has the usual gear 93, on its end just within the housing 85, and the counter-shaft 95 has a driving gear 97 fixed thereto and in constant driving engagement with gear 93. Counter-shaft 95 also has second speed gear 99, low-speed gear 101 and reverse gear 103. On the driven shaft is a slidable gear 105 which may be moved to the left in which position it has a clutch tooth engagement as at 107 with gear 93 for driving direct. When moved to the right gear 105 will mesh with gear 99 for driving at an intermediate or second speed. Also slidable on the spline shaft 93 is a gear 109 which, when moved to the left, engages gear 101 for low speed, and when moved to the right engages an idler, not shown, which is in engagement with 103 to secure reverse drive. In this case the over-speed is obtained by a gear 111 rigidly mounted on shaft 92 in constant engagement with a gear 113 slidable on shaft 95 and capable of being clutched to the teeth of gear 103 when moved to the left. It will be observed that gear 111 is of sufficient length so that it remains in mesh with gear 113 during the movements of the latter. For the purpose of operating this over-speed gear the casing is provided with a pivot 115 upon which is mounted a lever 117 and the lever carries a yoke 119 engaging the collar 121 of the gear 113. At its upper end the lever 117 engages a shifter fork 123 which is actuated by the usual operating lever in a manner which will be understood without further explanation.

By the arrangements described the gear shaft operates in the usual way making the shifts through reverse, low, intermediate and high. If an over-speed gear drive is desired the operating lever may be shifted transversely sufficiently to engage the notch in the over-speed shifting fork, whereupon it may be moved longitudinally to bring about the gear engagement required for this drive. It will be understood, of course, that the latch 71 will prevent any accidental shifting into over-speed when the driver pulls the operating lever from notch 49 into slot 59 for the purpose of shifting into second.

I claim:

1. In a transmission device including aligned driving and driven shafts and a countershaft, meshing gears secured to said driving shaft and said countershaft whereby the countershaft is constantly driven from the driving shaft, an elongated gear fixed on the driven shaft, a gear normally rotatably mounted on the countershaft in constant mesh with and slidable axially relative to the fixed gear on the driven shaft, means to clutch said last mentioned countershaft gear to its shaft, another gearing train including gears on said countershaft and driven shaft, each of said gears being non-rotatable relative to its shaft and one of said gears being slidable into mesh with the other.

2. In a transmission device including a driving shaft, a counter-shaft, intermeshing gearing rigidly mounted on said shafts whereby the countershaft is constantly driven by the driving shaft, a driven shaft, gearing between said driven shaft and said countershaft including spaced gears fixed on said countershaft and gears on the driven shaft slidable thereon to mesh with the said spaced gears on the countershaft, an over-speed drive comprising gearing on said counter-shaft and driven shaft, the gear on the counter-shaft being slidable into clutching engagement with teeth on a gear fixed to the counter-shaft.

3. In a transmission device including aligned driving and driven shafts and a countershaft driving mechanism between the driving shaft and the countershaft, a slidable clutch gear member on said driven shaft to clutch said aligned shafts together in one position of adjustment, a gear on said countershaft to be engaged by said slidable clutch gear element in another position of adjustment of the latter, a second slidable gear on said driven shaft, a gear on the countershaft to be engaged thereby to drive in low speed, an over-speed gear fixed on said driven shaft, a gear rotatably mounted on the countershaft in constant mesh with the over-speed gear and slidable on the countershaft to effect a clutch connection with the gear of the countershaft which forms a part of the low-speed train.

4. In a transmission device, aligned driving and driven shafts, a counter-shaft, constantly engaged gears rigid with the driving shaft and countershaft whereby the latter is driven from the former, a plurality of driving gears fixed to the counter-shaft, gears on the driven shaft slidable into engagement with said counter-shaft gears to secure drives at reduced ratios, a gear fixed to the driven shaft between two slidable gears on the driven shaft, a gear rotatably mounted on the counter-shaft in constant engagement with said fixed driven shaft gear and slidable into clutch engagement with the counter-shaft to effect an over-speed drive.

5. In a transmission device, a shaft having two spaced driving gears, a spline driven shaft having two gears slidable into engagement with the gears of the first mentioned shaft, a fixed gear between the two slidable gears of the driven shaft and a gear rotatable relative to the gears of the first mentioned shaft and slidable into clutch engagement with the second gear of said shaft, said fixed gear and rotatable gear being always in mesh and giving an over-speed drive.

In testimony whereof I affix my signature.

C. H. STERLING.